United States Patent [19]
Miura et al.

[11] Patent Number: 5,303,107
[45] Date of Patent: Apr. 12, 1994

[54] SYSTEM FOR HOLDING A TRACK COUNTER ACTIVE DESPITE POWER SUSPENSION IN ROTATING DISK DATA STORAGE APPARATUS

[75] Inventors: Tohru Miura, Chofu; Hiroshi Tsuyuguchi, Tokyo; Fumio Nagase, Tama; Miya Enami, Higashikurume, all of Japan

[73] Assignee: TEAC Corporation, Tokyo, Japan

[21] Appl. No.: 869,237

[22] Filed: Apr. 15, 1992

[30] Foreign Application Priority Data

Apr. 18, 1991 [JP] Japan .................................. 3-113957

[51] Int. Cl.⁵ ............................................ G11B 20/00
[52] U.S. Cl. ...................................................... 360/137
[58] Field of Search ............... 360/137, 78.14, 77.03, 360/71; 369/72

[56] References Cited

U.S. PATENT DOCUMENTS

| | | | |
|---|---|---|---|
| 4,345,286 | 8/1982 | Kanayama | 360/137 |
| 4,408,243 | 10/1983 | Bonner et al. | 360/137 |
| 4,471,391 | 9/1984 | Reagan | 360/137 |
| 4,618,230 | 10/1986 | Ens et al. | 351/211 |
| 4,688,112 | 8/1987 | Shoji et al. | 360/137 |
| 4,713,715 | 12/1987 | Abe | 360/137 |
| 4,860,131 | 8/1989 | Kowaguchi et al. | 360/78.14 |
| 4,999,721 | 3/1991 | Ogawa | 360/137 |

FOREIGN PATENT DOCUMENTS 55-45138  3/1980  Japan .................................. 360/137

*Primary Examiner*—John H. Wolff
*Assistant Examiner*—Allen Cao
*Attorney, Agent, or Firm*—Woodcock Washburn Kurtz Mackiewicz & Norris

[57] ABSTRACT

A floppy disk drive is disclosed which is for use with a host system capable of connecting its own power supply to the disk drive when its operation is needed, and disconnecting the power supply from the disk drive when its operation is not needed. The disk drive includes a stepper motor for moving a data transducer from track to track on a rotating magnetic disk, and a track counter for ascertaining the radial position of the transducer on the disk by counting the stepping pulses fed from the host system to a stepper motor control circuit. In order to maintain the count of the track counter despite power suspension, the track counter is connected to a supply terminal of the disk drive via a reverse blocking diode, and a capacitor is connected between the diode and ground. The track counter is therefore fed from the capacitor when the disk drive is disconnected from the power supply of the host system. Preferably, the count of the track counter when the disk drive is disconnected from the power supply may be temporarily stored on an electrically erasable, programmable read only memory, and the stored count may be returned to and preset on the track counter when the disk drive is subsequently powered on.

6 Claims, 4 Drawing Sheets

SYSTEM FOR HOLDING A TRACK COUNTER ACTIVE DESPITE POWER SUSPENSION IN ROTATING DISK DATA STORAGE APPARATUS

BACKGROUND OF THE INVENTION

This invention relates generally to apparatus for data transfer with a rotating data storage disk such as a flexible magnetic disk having a multiplicity of concentric annular record tracks, and more specifically to a system in such a rotating disk data storage apparatus for holding the count of a track counter unaltered despite power suspension.

The rotating disk data storage apparatus, or disk drive according to common parlance, has a transducer or transducers for reading and writing digital data on one or both major surfaces of the disk. Retrieved from the disk by the transducer, the data is directed through an amplifier, a filter and a differentiator to a comparator thereby to be shaped into form suitable for further processing.

Data retrieval from magnetic disks needs special consideration because of the fact that the record tracks on the disk become progressively less in diameter from the radially outmost one inward, that is, that the recording density of digital data becomes progressively higher from the radially outmost track inward. Consequently, were it not for the filter, the differentiator would produce different output waveforms for the same datum depending upon its radial position on the disk. The resolution of the differentiator would then deteriorate as the transducer travels radially inwardly of the disk.

The filter on the preceding stage of the differentiator represents a solution to this problem. The filter constant is varied in order to compensate for the difference in the resolution of the differentiator depending upon the radial position of the transducer on the disk. For instance, in a disk drive for use with a five and a quarter inch disk, the filter constant is set at one value when the transducer is on Tracks 0–43, and at another when the transducer is on Tracks 44–79. Further, in writing data on the disk, the write current for Tracks 44–76 is made approximately 20 percent less in magnitude than that for Tracks 0–43.

The track counter is a standard component of the disk drive, being needed for changing the filter constant and the write current magnitude depending upon the radial position of the transducer on the disk. Despite its name, however, the track counter does not actually count the tracks being traversed by the transducer. As is well known, the transducer travels from track to track on the disk as a bidirectional stepper motor rotates by small increments determined by stepping pulses and in a direction determined by a stepping direction signal. Both stepping pulses and stepping direction signal are supplied from the host system controlling the disk drive. Reset each time the transducer is recalibrated on Track Zero, the track counter counts the stepping pulses in an increasing or a decreasing direction depending upon the stepping direction signal, thereby indirectly counting the tracks being traversed by the transducer. The host system is supplied with this count and thus knows at every instant the current transducer position on the disk.

Usually, in personal computers, word processors and like data processing systems comprising a disk drive, the disk drive has no power switch of its own but is powered on and off with the host system. Recently, however, systems have been developed in which the host system disconnects the disk drive from the power supply when it is not in use, with a view to saving power.

Suppose that the disk drive is powered off while the host system remains on. Conventionally, being comprised of flip flops, the track counter was then incapable of holding the count. The track counter was reset when subsequently powered on. Then the transducer traveled to Track Zero as the host system delivered a recalibration command to the disk drive, so that the count of the track counter agreed with the transducer position on the disk.

The recalibration of the transducer each time the disk drive is reconnected to the power supply is objectionable because of the waste of time and electric energy. Reading or writing of data on the disk will be resumed far more quickly if the transducer traveled to a destination track directly from its position when the disk drive was powered off, instead of after being recalibrated on Track Zero.

Conventionally, however, the count of the track counter disagreed with the transducer position on the disk and with what the host system knew as the transducer position if the transducer was not recalibrated when the disk drive was powered on. It then became impossible for the track counter to correctly change the filter constant and the write current magnitude according to the radial position of the transducer on the disk.

The inconvenience discussed above is not limited to systems wherein the host system causes disconnection of the disk drive from the power supply. In some systems the disk drive may be separably connected to the host system and powered off for reasons other than the inherent function of the host system. When the disk drive is subsequently powered on, the count of the track counter also disagreed with the transducer position on the disk and with what the host system knew as the transducer position if the transducer was not recalibrated.

SUMMARY OF THE INVENTION

The present invention seeks to provide an improved rotating disk data storage apparatus that can quickly and correctly resume writing or reading when powered on after having been temporarily held off.

Briefly, the invention may be summarized as a rotating disk data storage apparatus suitable for use with a host system capable of connecting power supply means to the data storage apparatus when the operation of the apparatus is necessary, and disconnecting the power supply means from the data storage apparatus when the operation of the apparatus is unnecessary. The data storage apparatus comprises a transducer for data transfer with a rotating data storage disk, and transducer positioning means including stepper motor means for moving the transducer across record tracks on the disk under the control of a stepper motor control circuit responsive to stepping pulses. Also included is a track counter for ascertaining the radial position of the transducer on the disk by counting the stepping pulses being applied to the stepper motor control circuit. The track counter is connected to a read/write circuit for causing the same to change a prescribed data processing condition (e.g. write current magnitude or filter constant) depending upon the radial position of the transducer on the disk.

Characteristically, the track counter is connected to a supply terminal of the data storage apparatus, which is to be connected to the supply means of the host system, via a switching element such as a diode or transistor. This switching element is closed when the data storage apparatus is connected to the power supply means of the host system, and opened when the data storage apparatus is disconnected from the power supply means. Further a capacitor, rechargeable battery, or like storage means is connected between the switching element and ground for storing electrical energy fed from the power supply means of the host system when the switching element is closed.

Thus the track counter is fed from the power supply means of the host system when the data storage apparatus is connected thereto, and from the storage means when the data storage apparatus is disconnected from the power supply means. The switching element functions to prevent the discharge of the storage means to loads other than the track counter that are connected to the supply terminal, thereby permitting the track counter to be fed from the storage means for a relatively long time. Accordingly, with the track counter thus held active despite power suspension, the transducer need not be recalibrated but can be moved directly to a desired destination track when the apparatus is subsequently powered on.

In the case where a capacitor is employed as the storage means, it is recommended that an electrically erasable, programmable read only memory be used in combination with the capacitor. The count of the track counter may then be stored on the memory when the data storage apparatus is powered off, and the stored count may be returned to and preset on the track counter when the apparatus is subsequently powered on. The count of the track counter can then be maintained no matter how long the apparatus is held unpowered.

The above and other features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

Figure 1:
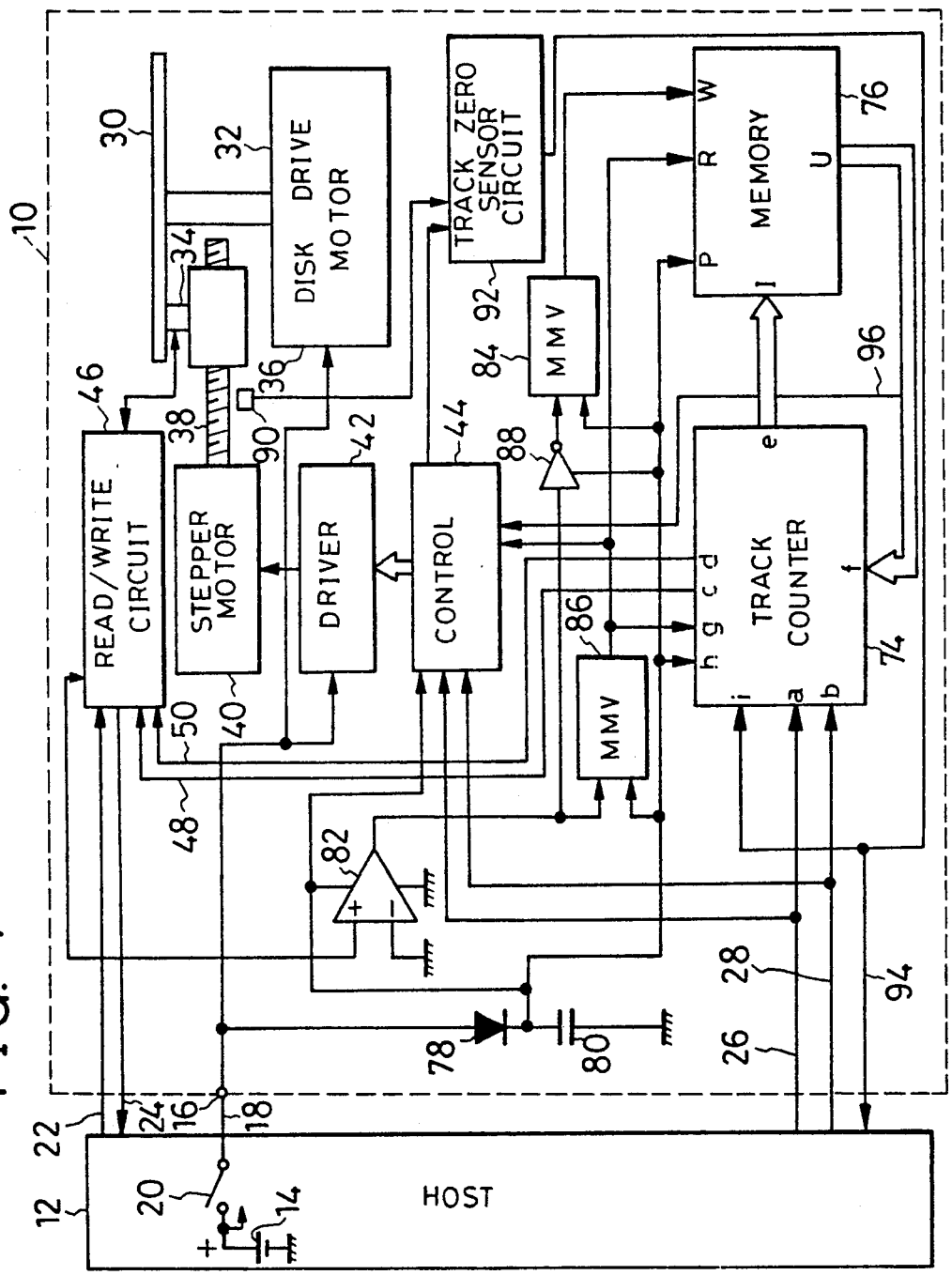
FIG. 1 is a block diagram of a flexible magnetic disk drive embodying the principles of this invention, the disk drive being shown together with a host system.

The floppy disk drive embodying the present invention is generally designated 10 in FIG. 1 and therein shown connected to a host system 12 via an interface circuit, not shown, of conventional design. The host system includes a power supply 14 which, despite its simplified showing, is understood to comprise a rectifier circuit and a voltage stabilizer circuit. The power supply 14 powers not only the host system 12 but also the disk drive 10, being connected to a supply terminal 16 of the disk drive by way of a supply line 18. A switch 20 on the supply line 18 is to be opened automatically when the disk drive 10 is out of operation, in order to save power.

The disk drive 10 is connected to the host system 12 via a write data input line 22, a read data output line 24, a stepping pulse input line 26 and a stepping direction signal line 28, which are all conventional in the art. Actually, there are many more signal lines connected between disk drive 10 and host system 12, but such additional signal lines are not shown because of their impertinence to the invention.

The disk drive 10 is shown to have a flexible magnetic disk 30 replaceably mounted in position therein. The magnetic disk 30 is to be rotated by a disk drive mechanism 32 of any known or suitable make comprising an electric motor. It is understood for the convenience of disclosure that the magnetic disk 30 is single sided, having, for example, eighty annular record tracks arranged concentrically, from outmost Track 0 to inmost Track 79, on only one major surface of the disk.

For writing and reading data on the single sided magnetic disk 30, a data transducer 34 is provided which travels across the tracks on the disk. The transducer 34 is shown mounted on a carriage 36 for such track accessing. The carriage 36 is constrained to travel radially of the magnetic disk 30 as a lead screw 38 is driven by a bidirectional stepper motor 40.

The stepper motor 40 is driven by a driver circuit 42 under the direction of a control circuit 44. The noted stepping pulse line 26 and stepping direction signal line 28 are both connected to the stepper motor control circuit 44. Thus, inputting the stepping pulses and the stepping direction signal from the host system 12, the stepper motor control circuit 44 will control the stepper motor driver circuit 42 accordingly. The stepper motor 40 will rotate through an angle determined by the stepping pulses and in a direction determined by the stepping direction signal, causing the transducer 34 to travel to a desired destination track on the disk 30.

The transducer 34 is electrically connected to a read/write circuit 46 which in turn is connected to the host system 12 by way of the write data line 22 and read data line 24. Also, the read/write circuit 46 has a write current control line 48 and filter control line 50 connected thereto.

Figure 2:
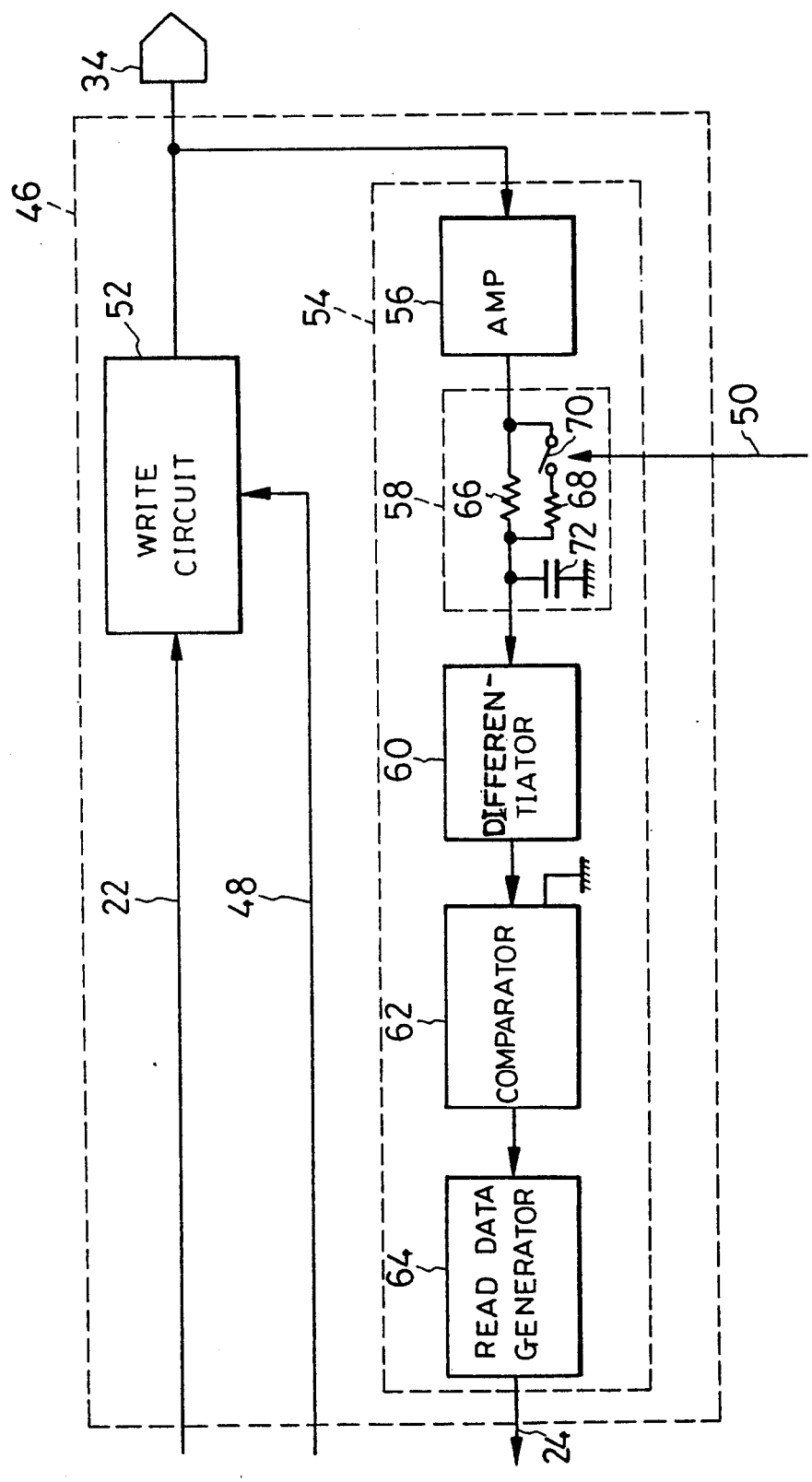
FIG. 2 is a block diagram of a read/write circuit included in the disk drive of FIG. 1.

As illustrated in detail in FIG. 2, the read/write circuit 46 includes a write circuit 52 and a read circuit 54. Connected between write data line 22 and transducer 34, the write circuit 52 functions conventionally to supply a write current representative of the input write data to the transducer. Also, the write circuit 52 has the write current control line 48 connected thereto. It is understood that the write circuit 52 conventionally includes a selector switch, not shown, for changing the magnitude of the write current depending upon whether the transducer 34 is on, say, Tracks 0–43 or on Tracks 44–79. Of course, as desired, the write current magnitude may be changed to three or more values depending upon the radial position of the transducer on the disk.

Connected between transducer 34 and read data line 24, the read circuit 54 is shown as a serial connection of amplifier 56, filter 58, differentiator 60, comparator 62 and a read data generator circuit 64, in that order from transducer toward read data line. All these components of the read circuit 54 are conventional, so that only the filter 58 will be described in some more detail because of its pertinence to the present invention.

The filter 58 comprises a parallel connection of first 66 and second 68 resistors, with an on/off switch 70 connected in series with the second resistor, and a capacitor 72. The filter control line 50 is connected to the switch 70 for its on/off control. The capacitance/resistance time constant of the filter 58 is therefore varied as the switch 70 is turned on or off.

With reference back to FIG. 1 the disk drive 10 includes a track counter 74 for changing the write current magnitude of the read/write circuit 46 and the constant of the filter 58 depending upon the radial position of the transducer 34 on the magnetic disk 30. Itself of conventional design, the track counter 74 has a stepping pulse input a, stepping direction signal input b, write current control output c, filter control output d, count output e, preset input f, preset control input g, supply input h, and reset input i.

The stepping pulse input a and stepping directional signal input b of the track counter 74 are connected to the host system 12 by way of the noted lines 26 and 28. The write current control output c is connected to the write circuit 52, FIG. 2, by way of the line 48. The filter control output d is connected to the filter 58, FIG. 2, by way of the line 50. The count output e is connected to the input I of an electrically erasable, programmable read only memory (EEPROM) 76, and the preset input f is connected to the output U of the EEPROM 76.

Although shown as a single block for illustrative convenience, the EEPROM 76 is actually a combination of a memory proper and a control circuit therefor. Further the stepper motor control circuit 44, track counter 74 and EEPROM 76 may be combined into a single integrated circuit.

The supply terminal 16 of the disk drive 10 is connected to all of the disk drive mechanism 32, the stepper motor driver circuit 42 and the read/write circuit 46. These components of the disk drive 10 are therefore fed from the power supply 14 of the host system 12 as long as the switch 20 is closed.

Additionally, according to the present invention, the supply terminal 16 is connected via a reverse blocking diode 78 to a capacitor 80 and thence grounded. The diode 78 functions as switch, disconnecting the capacitor 80 from the supply terminal 16 when the supply voltage drops to a predetermined value. The capacitor 80, on the other hand, serves as temporary power supply during power suspension. The diode side of the capacitor 80 is connected to both the supply input h of the track counter 74 and the supply terminal P of the EEPROM 76.

Further, the diode side of the capacitor 80 is connected to the supply inputs of a comparator 82, two monostable multivibrators (MMVs) 84 and 86, and NOT circuit 88. The comparator 82 has a positive input connected to the supply terminal 16 and a negative input grounded. Therefore, as indicated at (B) in FIG. 3, the comparator 82 goes high when the disk drive 10 is powered on as at (A) in FIG. 3, and low when the disk drive is off. The negative input of the comparator 82 could be connected to the capacitor 80 or to some source of a reference voltage less than the supply voltage.

The MMVs 84 and 86 and NOT circuit 88 are all employed for controlling the track counter 74 and EEPROM 76. The first MMV 84 has its trigger input connected to the comparator 82 via the NOT circuit 88. Accordingly, triggered when the comparator 82 goes low, the first MMV 84 puts out a pulse of predetermined duration $T_1$ as at (C) in FIG. 3. The output of the first MMV 84 is connected to the write control input W of the EEPROM 76, so that this memory has its previously stored track information erased during the duration $T_1$ of the first MMV output pulse and, instead, stores the current count of the track counter 74. It is understood that the capacitor 80 has sufficient capacitance to continue energization of the track counter 74 and associated circuits for a time $T_3$, FIG. 3, longer than the pulse duration $T_1$ after the disk drive 10 has been turned off.

Figure 3:
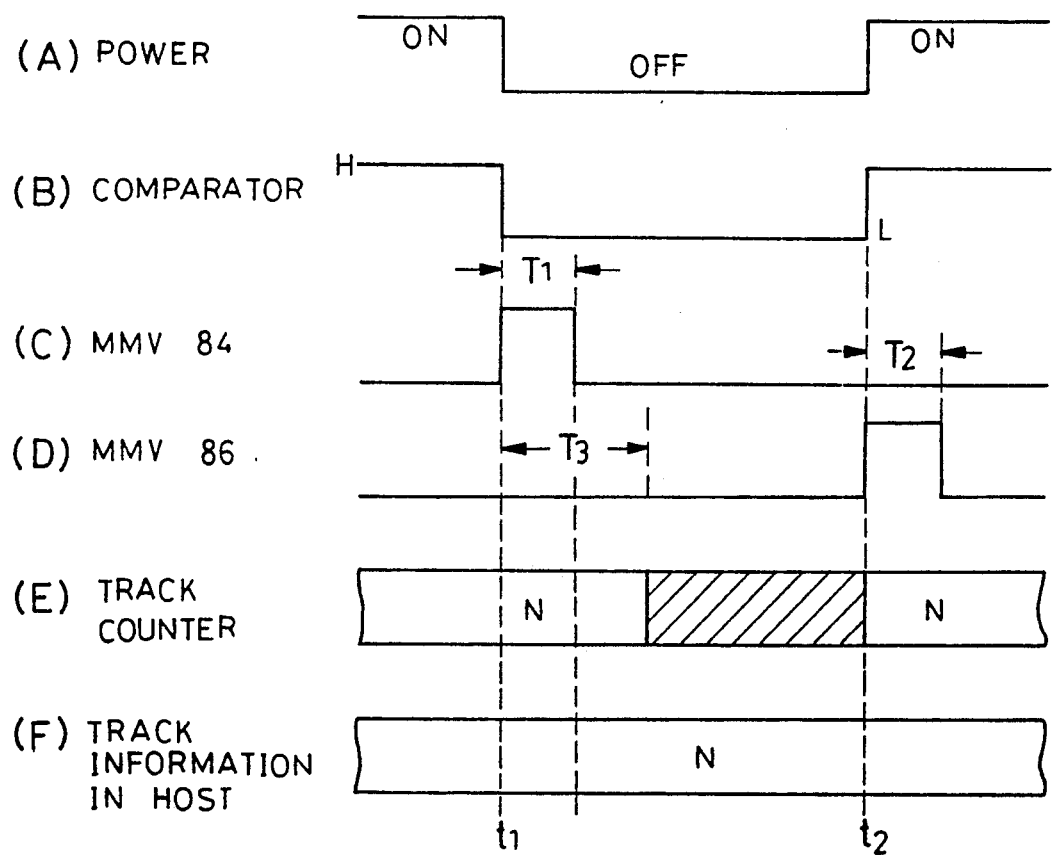
FIG. 3, consisting of (A) through (F), is a timing chart explanatory of the operation of the FIG. 1 disk drive.

Having its trigger input connected directly to the comparator 82, the second MMV 86 is triggered when the comparator goes high, producing a pulse of predetermined duration $T_2$ as at (D) in FIG. 3. The output of the second MMV 86 is connected to the read control input R of the EEPROM 76, the preset control input of the stepper motor control circuit 44, and the present control input g of the track counter 74. The track information that has been stored on the EEPROM 76 is therefore preset on the track counter 74 when the second MMV 86 puts out a pulse as at a moment $t_2$ in FIG. 3. The stepper motor control circuit 44 responds to the output pulse of the second MMV 86 by causing the driver circuit 42 to energize a predetermined phase (usually, first phase) of the stepper motor 40.

At 90 in FIG. 1 is seen a Track Zero sensor which, relying on the position of the transducer carriage 36, senses the fact that the transducer 34 is on Track Zero on the disk 30. The output of this Track Zero sensor is connected to a Track Zero sensor circuit 92, which has another input connected to the stepper motor control circuit 44. The Track Zero sensor circuit 92 determines that the transducer 34 is on Track Zero, when the track Zero sensor 90 signals to that effect and, at the same time, the stepper motor control circuit 44 puts out a signal for causing the first phase energization of the stepper motor 40. Upon determination of the fact that the transducer 34 is on Track Zero, the Track Zero sensor circuit 92 signals the host system 12 to that effect over a line 94 and also applies a resetting signal to the reset input i of the track counter 74.

It is understood that in the illustrated embodiment, the host system 12 when powered on delivers stepping pulses over the line 26 to the disk drive 10 for causing the transducer 34 to be positioned on Track Zero. However, when powered on at the time $t_2$ in FIG. 3, the disk drive 10 does not recalibrate the transducer 34 on Track Zero. The track counter 74 is reset each time the Track Zero sensor circuit 92 determines the recalibration of the transducer, and resumes the counting of the stepping pulses subsequently supplied from the host system 12.

It will be noted from FIG. 1 that the bus between the output U of the EEPROM 76 and the input f of the track counter 74 has a line 96 branching off therefrom and connected to the stepper motor control circuit 44. This line 96 is intended for the delivery of the least significant bit of the track information output from the EEPROM 76 in order to enable the stepper motor control circuit 44 to determine which phase of the stepper motor 40 is to be energized.

OPERATION

The host system 12 is of such known construction that the switch 20 automatically opens to disconnect the disk drive 10 from the power supply 14 when it is out of operation, as at the moment $t_1$ in FIG. 3. The track counter 74 and associated circuits of the disk drive 10 are not immediately powered off, however, because of the provision of the capacitor 80 in accordance with the invention.

As indicated at (E) in FIG. 3, the count (track information) N of the track counter 74 will disappear upon lapse of the time $T_3$, during which the capacitor 80 energizes the track counter, after the disk drive has been disposed from the power supply 14 at the moment $t_1$. However, the track information N will be written on the EEPROM 76 during the time $T_1$, FIG. 3(C), shorter than the time $T_3$. It will be seen from FIG. 1 that the EEPROM 76 is also fed from the capacitor 80 during the time $T_3$. The EEPROM 76 by its very nature is capable of holding the track information N even after the capacitor 80 has ceased functioning as temporary power supply upon lapse of the time $T_3$ following the moment $t_1$.

Thus, according to the present invention, the transducer 34 need not be recalibrated on Track Zero on the disk 30 when the disk drive 10 is subsequently powered on at the moment $t_2$, as at (A) in FIG. 3. The track information N which has been stored on the EEPROM 76 will then be returned to, or preset on, the track counter 74, as at (E) in FIG. 3, during the time $T_2$, FIG. 3(D), following the moment $t_2$. Now the count of the track counter 74 agrees with the actual transducer position on the disk 30 and with the track information N known at that time to the host system 12 as at (F) in FIG. 3. No trouble is therefore to occur in subsequently changing the write current magnitude and the filter constant depending upon the transducer position on the disk 30.

As will be noted by referring to FIG. 1 again, the disk drive 10 employs the lead screw 38 for translating the rotation of the stepper motor 40 into the linear travel of the transducer 34. Accordingly, while the disk drive 10 is unpowered as from moment $t_1$ to moment $t_2$, the transducer 34 is positively maintained on the same track on the disk 30 as at the moment $t_1$.

It will also be observed from FIG. 1 that the reverse blocking diode 78 functions to isolate the capacitor 80 from the disk drive motor 32, stepper motor driver circuit 42 and read/write circuit 46, which need not be energized while the disk drive 10 is unpowered. The current discharged by the capacitor 80 after the moment $t_1$ is therefore not to flow into these circuits, so that the capacitor can be of relatively small capacitance.

SECOND FORM

Figure 4:
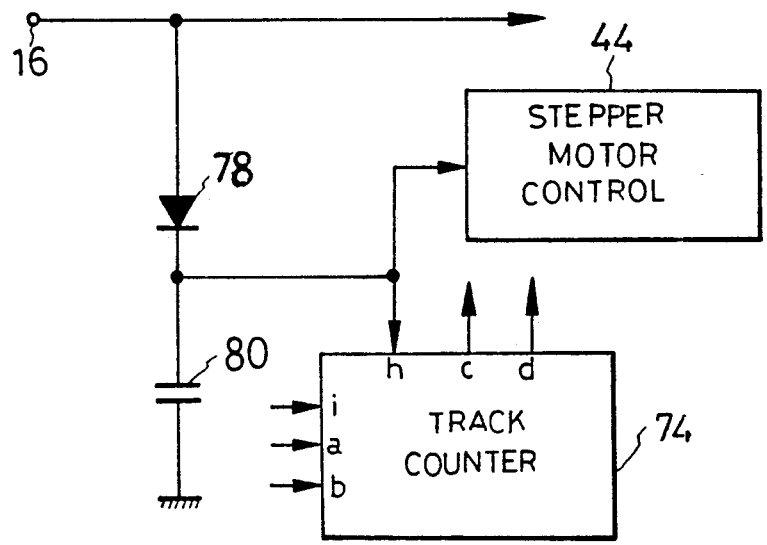
FIG. 4 is a partial block diagram of a modification of the FIG. 1 disk drive.

The EEPROM 76, MMVs 84 and 86, and NOT circuit 88 of the FIG. 1 disk drive 10 may be omitted in cases where the disk drive is to be held off for lengths of time shorter than the discharge time of the capacitor in use. Thus, in FIG. 4, the capacitor 80 is shown connected to only the track counter 74 and stepper motor control circuit 44. Isolated from the other circuits by the reverse blocking diode 78, the capacitor 80 will discharge very slowly.

THIRD FORM

Figure 5:
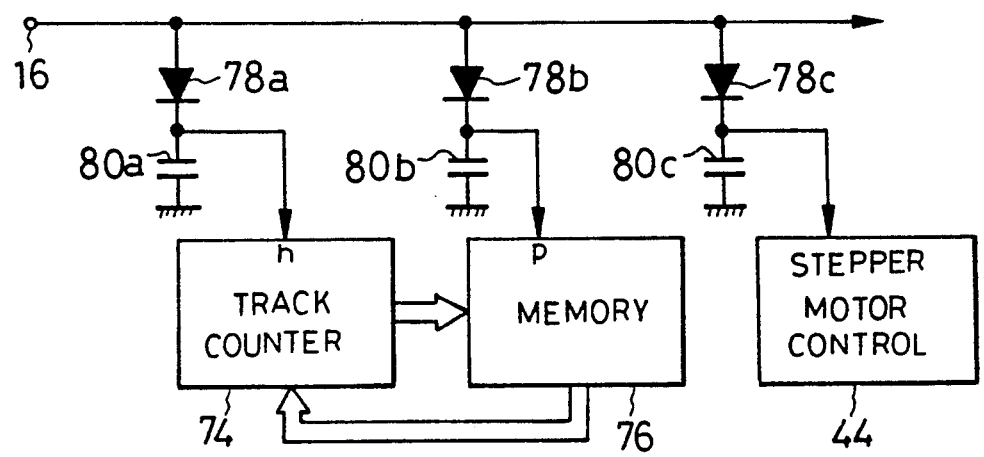
FIG. 5 is a partial block diagram of another modification of the FIG. 1 disk drive.

Not one but two or more capacitors may be employed for energizing the track counter and other components of the disk drive after it has been disconnected from the power supply of the host system. FIG. 5 shows three capacitors 80a, 80b and 80c connected respectively to the track counter 74, EEPROM 76 and stepper motor control circuit 44. Reverse blocking diodes 78a, 78b and 78c may be connected respectively between the capacitors 80a, 80b and 80c and the supply terminal 16.

MODIFICATIONS

Notwithstanding the foregoing detailed disclosure of some preferable embodiments of this invention, it is not desired that the invention be limited by the exact details of such disclosure. A variety of modifications, alterations and adaptations of the illustrated embodiments will suggest themselves to those skilled in the arts without departing from the scope of the invention as expressed in the appended claims. For example, the capacitor 80 could be replaced by other storage means such as a rechargeable battery. The diode 78 could also be replaced by other switch means such as a transistor, and such a switching element may be held on while the disk drive is powered from the host system, and off while the disk drive is unpowered.

What is claimed is:

1. A rotating disk data storage apparatus suitable for use with a host system capable of connecting power supply means to the data storage apparatus when the operation of the apparatus is necessary, and disconnecting the power supply means from the data storage apparatus when the operation of the apparatus is unnecessary, the rotating disk data storage apparatus comprising:

(a) a transducer for data transfer with a rotating data storage disk having a multiplicity of record tracks thereon;

(b) transducer positioning means including stepper motor means for moving the transducer across the record tracks on the data storage disk;

(c) a stepper motor control circuit connected to the stepper motor means for causing the transducer to be positioned on successive destination tracks on the data storage disk in response to stepping pulses;

(d) a read/write circuit connected to the transducer for processing data being transferred between the transducer and the data storage disk, the read/write circuit having means for changing a data processing condition;

(e) a track counter for ascertaining the radial position of the transducer on the data storage disk by counting the stepping pulses being applied to the stepper motor control circuit, the track counter being connected to the changing means of the read/write circuit for causing the same to change the data processing condition depending upon the radial position of the transducer on the data storage disk;

(f) a supply terminal to be connected to the power supply means of the host system, the supply terminal being connected at least to the track counter so that the track counter is fed from the power supply means of the host system when the data storage apparatus is connected thereto;

(g) a switching element connected between the supply terminal and the track counter, the switching element being closed when the data storage apparatus is connected to the power supply means of the host system, and opened when the data storage apparatus is disconnected from the power supply means; and (h) storage means connected between the switching element and ground for storing electrical energy fed from the power supply means when the switching element is closed;

(i) whereby the track counter is fed from the storage means, instead of from the power supply means of the host system, when the data storage apparatus is disconnected from the power supply means; and further comprising memory means for having a count of the track counter stored thereon when the data storage apparatus is disconnected from the power supply means of the host system, and for having the stored count preset on the track counter when the data storage apparatus is reconnected to the power supply means of the host system.

2. The rotating disk data storage apparatus of claim 1 wherein the memory means comprises:

(a) an electrically erasable, programmable read only memory connected to the track counter;

(b) a comparator connected to the supply terminal for producing an output indicative of whether the data storage apparatus is connected to, or disconnected from, the power supply means of the host system;

(c) a first monostable multivibrator connected between the comparator and the memory for causing the count of the track counter to be stored on the memory when the data storage apparatus is disconnected from the power supply means of the host system; and (d) a second monostable multivibrator connected between the comparator and the memory for causing the stored count to be transferred from the memory to, and preset on, the track counter when the data storage apparatus is reconnected to the power supply means of the host system.

3. The rotating disk data storage apparatus of claim 2 wherein the memory and the comparator and the first and the second monostable multivibrator are all connected directly to the storage means.

4. The rotating disk data storage apparatus of claim 1 further comprising:

(g) a second switching element connected between the supply terminal and the memory means, the second switching element being closed when the data storage apparatus is connected to the power supply means of the host system, and opened when the data storage apparatus is disconnected from the power supply means; and (h) second storage means connected between the second switching element and ground for storing electrical energy fed from the power supply means when the second switching element is closed;

(i) whereby the memory means is fed from the second storage means, instead of from the power supply means of the host system, when the data storage apparatus is disconnected from the power supply means.

5. The rotating disk data storage apparatus of claim 4 further comprising:

(g) a third switching element connected between the supply terminal and the stepper motor control circuit, the third switching element being closed when the data storage apparatus is connected to the power supply means of the host system, and opened when the data storage apparatus is disconnected from the power supply means; and (h) third storage means connected between the third switching element and ground for storing electrical energy fed from the power supply means when the third switching element is closed;

(i) whereby the stepper motor control circuit is fed from the third storage means, instead of from the power supply means of the host system, when the data storage apparatus is disconnected from the power supply means.

6. A rotating disk data storage apparatus suitable for use with a host system capable of connecting power supply means to the data storage apparatus when the operation of the apparatus is necessary, and disconnecting the power supply means from the data storage apparatus when the operation of the apparatus is unnecessary, the rotating disk data storage apparatus comprising:

(a) a transducer for data transfer with a rotating data storage disk having a multiplicity of record tracks thereon;

(b) transducer positioning means including stepper motor means for moving the transducer across the record tracks on the data storage disk;

(c) a stepper motor control circuit connected to the stepper motor means for causing the transducer to be positioned on successive destination tracks on the data storage disk in response to stepping pulses;

(d) a read/write circuit connected to the transducer for processing data being transferred between the transducer and the data storage disk, the read/write circuit having means for changing a data processing condition;

(e) a track counter for ascertaining the radial position of the transducer on the data storage disk by counting the stepping pulses being applied to the stepper motor control circuit, the track counter being connected to the changing means of the read/write circuit for causing the same to change the data processing condition depending upon the radial position of the transducer on the data storage disk;

(f) a supply terminal to be connected to the power supply means of the host system, the supply terminal being connected directly to the transducer positioning means end the read/write circuit;

(g) a switching element through which the stepper motor control circuit and the track counter are connected to the supply terminal, the switching element being closed when the data storage apparatus is connected to the power supply means of the host system, and opened when the data storage apparatus is disconnected from the power supply means, so that the stepper motor control circuit and the track counter are fed from the power supply means of the host system when the data storage apparatus is connected thereto; and (h) storage means connected between the switching element and ground for storing electrical energy fed from the power supply means when the switching element is closed;

(i) whereby the stepper motor control circuit and the track counter are fed from the storage means, instead of from the power supply means of the host system, when the data storage apparatus is disconnected from the power supply means; and further comprising memory means for having a count of the track counter stored thereon when the data storage apparatus is disconnected from the power supply means of the host system, and for having the stored count preset on the track counter when the data storage apparatus is reconnected to the power supply means of the host system, the memory means being connected to the supply terminal via the switching element.

* * * * *